United States Patent Office 2,989,358
Patented June 20, 1961

2,989,358
**DYESTUFFS FOR POLYOLEFINS AND POLY-
VINYLIDENE CHLORIDE**
Wolfgang Jurgeleit, Davenport, Iowa, assignor to Vereinigte Glanzstoff-Fabriken A.G., Wuppertal-Elberfeld, Germany
No Drawing. Filed Sept. 23, 1958, Ser. No. 762,680
Claims priority, application Germany Sept. 25, 1957
6 Claims. (Cl. 8—41)

This invention relates to new and improved dyestuffs for dyeing polyolefins, especially polyethylene, and polyvinylidene chloride and to an improved and simplified method of dyeing these synthetic polymers, particularly when in the form of artificial fibers, filaments, fabrics or similar textile products.

Polyolefins and polyvinylidene chloride are known to have good fiber forming properties, and more recently, the polyolefins have particularly received additional attention because of the improved fibers which can be produced from the so-called "low pressure polyolefins" having a high molecular weight and a correspondingly higher softening point. Because of its relative cheapness, polyethylene is especially preferred as an artificial fiber, but its use as a fiber prior to development of the low pressure process was rather limited because of its low softening point. Nevertheless, its inert properties rendered it highly useful for specific applications. The low pressure process for the production of polyethylene and other polyolefins has now caused considerable interest in this polymer for extensive use in the textile industry. Although more expensive, polypropylene has some very excellent fiber properties so that it too will undoubtedly have important applications, at least as a blend for mixed fibers. The higher polyolefins, e.g. polybutylene and polypentene or similar linear hydrocarbon polymers, will probably be severely limited in their applications in favor of polyethylene and polypropylene. It is known that mixed polymers or copolymers can be obtained from the lower monoolefins in order to modify the properties of those which are least expensive, and such products should also be included in the class of polyolefins.

In spite of the development of polyolefins and polyvinylidene chloride as artificial fibers having improved physical properties, they have one very serious drawback in the textile industry. These polymers have only a very slight affinity for known dyestuffs, and it is exceedingly difficult to apply the few dyestuffs which have found some utility.

Processes have been developed in which dyeing is accomplished with certain dyestuffs in the presence of an organic solvent, and these processes have found application to various synthetic fibrous materials, especially the polyolefins. Generally, the results obtained in this manner have proven somewhat satisfactory with respect to such coloring effects as hue, shade, different colors and the like, but the dyeing process itself is far from being simple because in each case it is necessary to remove the solvent from the dyed polymer. Also, the fastness of these dyestuffs when applied to polyolefins or similar polymers is often very poor, particularly as regards fastness to solvents.

Most attention in dyeing the polyolefins or similar polymers has been focused on the use of organic solvents as a dyeing medium because it seems to be the only feasible method of easily introducing a dye into a fiber, filament or the like. The polyolefins and polyvinylidene chloride are said to be difficult to dye because they have no dyeing sites, i.e. as in cellulose or similar materials, with which a substituent portion or group of the dyestuff can react in a chemical combination.

Disperse dyestuffs have been very useful with some artificial fibers such as cellulose acetate, from which the dyestuffs are known as "acetate rayon dyes," and a few others including nylon, polyethylene terephthalate and Vinyon. However, these disperse dyestuffs have not been satisfactory for dyeing polyolefins and polyvinylidene chloride. Internal dyeing, i.e. incorporation of pigments into a polymer prior to spinning or extruding into filaments, films or other products, has also been used, but the color effects which can be obtained are very limited.

Accordingly, it would be highly desirable to improve the manner in which the polyolefins and polyvinylidene chloride can be dyed, not only for technological reasons but also for economic reasons. A simple and inexpensive method of dyeing these materials would find immediate application and greatly extend the use of these polymers in commercial products, particularly in the textile field.

One object of the present invention is to provide new and highly useful dyestuffs for application to polyolefins and polyvinylidene chloride.

Another object of the invention is to provide novel dyestuffs which can be applied to polyolefins and polyvinylidene chloride without the use of organic solvents.

Still another object of the invention is to provide a much improved and more convenient method of dyeing polyolefins and polyvinylidene chloride.

Yet another object of the invention is to provide improved dyed polyolefin and polyvinylidene chloride products, especially fibers, filaments or the like, which are fast to solvents and to wash baths.

These and other objects and advantages of the invention will become more apparent upon a consideration of the following detailed disclosure.

In accordance with the invention, I have now found that the presence of an alkyl substituent having at least 7 carbon atoms in a nuclear component of the benzene series, which is found in many water-insoluble dyestuffs, provides a very excellent means of adding these dyestuffs to polyethylene, polypropylene or other polyolefins and also to polyvinylidene chloride, particularly when these polymers are in the form of fibrous materials.

Water-insoluble dyestuffs of the invention are those which have at least one nuclear component of the benzene series, i.e. benzene itself or its higher homologues such as naphthalene, anthracene and the like. The dyestuff must, of course, contain one of the known chromophoric groups, for example, an azo group, a nitro group, an ethylene group or a carbonyl group. As auxochromic groups, it is preferable to use those dyestuffs which in addition to the long chain alkyl group contain only neutral substituents such as halogen, lower alkyl and alkoxy, nitro and sulfonamide groups. Water-solubilizing groups should generally be avoided, particularly the strongly acidic substituents such as carboxylic and sulfonic groups. Strongly basic groups should likewise be avoided. The presence of an hydroxy group is usually desirable in the coupling component of an azo dyestuff in order to facilitate the coupling reaction, and amino groups are of course present in the diazo component prior to diazotization. Developed dyes, e.g. the azoics, require an amino group for further coupling after a first component has first been applied to the fiber.

The dyeing of the polyolefins and polyvinylidene chloride can be accomplished directly from a hot aqueous dispersion or suspension in which the alkyl-substituted dyestuff has been finely distributed with the aid of a suitable dispersing agent.

With azo dyestuffs, either the diazo component or the coupling component can first be applied to the fiber in the same manner from an aqueous dispersion and the remaining component then coupled to it in order to produce the dyestuff directly on the fiber. Developed dyestuffs are thus possible in which a coupling component is added to a diazotized material which has already been applied or introduced on to the fiber.

The basic concept of the present invention was the idea that a long chain alkyl substituent in a dyestuff might show some kind of affinity for the highly linear hydrocarbon structure which appears in polyethylene and other polyolefins. It was then found that such affinity did appear to exist and with very successful results provided that the alkyl substituent contained at least 7 carbon atoms. This alkyl substituent group can be represented by the formula $-C_nH_{(2n+1)}$ in which $n$ is an integer of at least 7, and preferably from 7 to 20, inclusive. Surprisingly, the alkyl carbon atoms can be joined in a straight chain or branched chain arrangement, although the basic concept was directed to the straight chain alone. More than 20 carbon atoms in the alkyl substituent would be possible but not particularly practical.

The effectiveness of the alkyl substituent was tested by selecting the azo group of dyestuffs, i.e. those dyestuffs containing the $-N=N-$ chromophore between two aryl nuclei of the benzene series. A very wide variety of colors, shades, hues and the like can be obtained from these azo dyestuffs, and they can be readily prepared from relatively cheap raw materials. The azo group of dyestuffs was also selected since the various auxochrome substituents could be held to an absolute minimum in order to provide the most accurate test of the effectiveness of the long chain alkyl substituent.

With these azo dyestuffs, the most suitable diazo components are those derived from aniline, particularly where the long chain alkyl group is in para-position to the amino group. As coupling components, the phenols, para-substituted alkyl phenols and β-naphthols were employed. These compounds are either well known or, in the case of the alkyl substituted benzenes and alkyl substituted phenols, can be readily made by suitable alkylation of the benzene ring, for example, by a Friedel-Crafts alkylation reaction with a mono-olefin having 7 or more carbon atoms. These dyestuffs are represented by one of the following formulae:

(1)
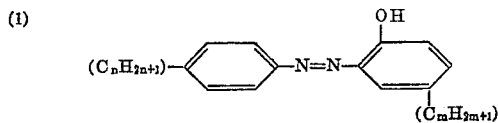

and (2)
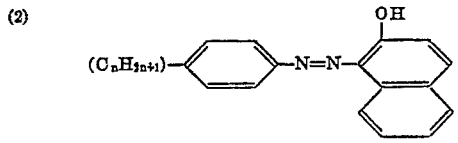

wherein $n$ and $m$ represent an integer of from 7 to 20, inclusive.

The water-insoluble dyestuffs of the invention can be applied to fibers in a number of different ways. However, it is a particular feature of the invention that the novel alkyl substituted dyestuffs can be directly applied from a hot aqueous solution in a manner similar to that employed with the disperse or acetate rayon dyestuffs. The dyestuffs are simply dispersed or suspended in water with a suitable dispersing agent and the fibrous material immersed in the resulting bath while it is maintained at an elevated temperature, e.g. from about 50–100° C., preferably about 70–95° C. The dyestuff concentration will ordinarily be about 0.5 to 5% by weight of water, depending upon the particular result desired. The dispersing agent is present in a quantity sufficient to finely distribute the dyestuff throughout the bath and is also best employed in about the same concentration of 0.5 to 5%. These aqueous suspensions can be used as dye baths without any further special measures, and the dyestuff is directly applied to the polyolefin or polyvinylidene chloride material which is immersed in the hot bath.

Alternatively, one of the components of a dyestuff, e.g. the diazo or the coupling component of an azo dyestuff, can first be brought upon the fibrous material in an identical manner. The dyestuff can then be produced directly upon the fiber itself by coupling the other component in a slightly alkaline aqueous media. Such methods of developing the dye upon a fiber are well known and the addition of the second component can be readily accomplished without further instruction to those skilled in the art. Thus, for example, it is possible to emulsify an alkyl phenol first with the aid of a suitable emulsifier to an approximately 5% dispersion in water and treat the filaments with this dispersion at 70 to 90° C. The treated material is then introduced into a weakly alkaline, aqueous diazo solution of an alkylated aniline so that the dyestuff arises on the fiber through the usual coupling reaction. If need be, a slight heating may be necessary at this point. The reverse method merely requires that the filaments first be treated with a diazotized alkyl aniline and subsequently coupled with a phenol or alkyl phenol.

The wide application of the invention for the purpose of dyeing polyolefins and polyvinylidene chloride is further illustrated by the following examples in which parts are parts by weight unless otherwise indicated. The invention is not to be restricted to these examples since they are intended to show the specific utility of a long chain alkyl substituent of at least 7 carbon atoms while the azo dyestuffs are merely illustrative and not exclusive.

*Example 1*

Four parts of p-nonyl phenol are dispersed in 100 parts of water with the aid of 2 parts of Emulphor ELN (an addition product of alkyl phenol and ethylene oxide). A yarn of low pressure polyethylene (molecular weight=150,000) which is composed of 30 individual filaments of 1.5 denier is immersed in the dispersion at a temperature of about 80° C. The bath ratio amounts to 50:1. The treatment of the yarn is continued for about half an hour. Thereafter, the filaments are superficially rinsed with water and transferred into an aqueous, weakly alkaline solution of diazotized p-cetyl-aniline. The filaments are thereby dyed a deep brown. According to the usual coupling of the two components, the azo dyestuff thus produced on the filaments has the formula

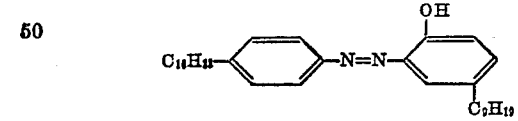

Boiling with soap solution follows and the filaments are then rinsed with cold water. The golden brown coloration of the filaments shows a good fastness to washing (e.g. laundry baths) and to solvents.

*Example 2*

According to known procedures, i.e. the usual diazotization and coupling, an azo dyestuff is produced from p-aminooctylbenzene and β-naphthol. The dyestuff thus obtained with a straight chain alkyl substituent has the following formula:

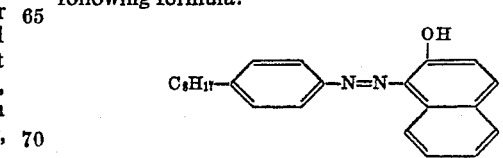

With this dyestuff, filaments of polypropylene (molecular weight=90,000) are dyed in a dye bath which contains 3 parts of the dyestuff dispersed in 100 parts of water with 2 parts of Emulphor ELN and 0.5 part of Marseilles soap (a soap made from olive oil which product is also known as castile soap). The bath ratio amounts to 50:1. Dyeing is continued for about half an hour at about 90° C. A brilliant golden orange coloration is obtained with good fastness properties.

*Example 3*

According to known procedures, a dyestuff is produced by coupling diazotized p-cetyl aniline with p-cetyl phenol. The melting point of this dyestuff is about 50 to 52° C., and it has the formula

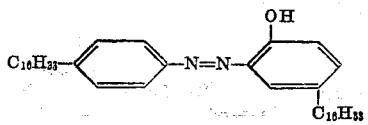

Polyethylene filaments (molecular weight=250,000) were dyed between 80° C. and 90° C. in a dye bath which contained 2 parts of the dyestuff dispersed in 100 parts of water with 1 part of Emulphor ELN and 0.5 part of Marseilles soap. The dyeing time is about half an hour with a bath ratio of 50:1. A lustrous dark orange coloration is obtained with good fastness properties.

*Example 4*

An azo dyestuff of melting point 91° C. is produced by coupling diazotized p-stearyl aniline to β-naphthol and has the following formula containing a straight chain alkyl substituent:

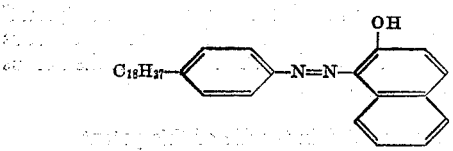

Polyethylene filaments (molecular weight=100,000) are dyed in a dye bath which contains 4 parts of this dyestuff dispersed in 100 parts water with 2 parts of Emulphor ELN and 1 part of Marseilles soap. Dyeing is continued for about half an hour at 95° C. A brilliant, yellowish-red coloration is obtained of good fastness to washing and solvents.

*Example 5*

A monofilament of polyvinylidenechloride having a 0.2 mm. cross section is dyed with the azo dyestuff described in Example 2 obtained by diazotizing p-aminooctyl benzene and coupling with β-naphthol. The dye bath is composed of 0.5 part of dyestuff, 0.5 part of Hostapal W (highly concentrated), 0.4 part of Marseilles soap and 100 parts of water. Dyeing is continued for half an hour at a temperature of 90 to 95° C. and a bath ratio of 50:1. Boiling of the filament is then accomplished with a hot soap solution followed by rinsing with cold water, and after drying, it is given a brief aftertreatment with cold petroleum ether. The filament is dyed a deep orange. A microscopic section shows that ⅔ of the cross-sectional area is dyed.

The fastness of these colorations or dyeings to solvents and washing is good. Thus, for example, a fastness test according to the method prescribed by the British Fastness Commission ("B1810," published in Albert Schäffer, Handbuch der Färberei, volume 3, experimental portion, Stuttgart, 1950, page 198) with respect to the action of solvents shows that the dyeing corresponds to Norm V for color tone alteration, and in respect to bleeding, it corresponds to Norm III.

A test of the washing fastness, according to the method prescribed by the British Fastness Commission ("B1210," Schäffer, page 175), showed that the dyeing corresponds to Norm IV (unchanged) in respect to a color tone alteration, and in respect to bleeding, it corresponds to Norm III.

The dyeings and their good fastness to washing and solvents as shown in the above examples will readily indicate to those skilled in the art the importance of the long chain alkyl group in dyestuffs for a very convenient and economical coloration of polyolefins and polyvinylidene chloride. The practical use of this particular alkyl substituent in other dyestuffs is clearly indicated since it appears to act in a very substantive manner and would be comparable to the use of a carboxylic group in dyeing cotton. Neutral auxochrome groups would not effect this substantive nature of the 7 carbon atom or longer alkyl group. Likewise, dyestuffs containing chromophoric groups other than the azo group would not change this substantive effect.

In some respects, the water-insoluble dyestuffs of the invention correspond to the disperse dyestuffs since the dyeing is accomplished from a hot aqueous dispersion. However, it was found that besides the polyolefins only polyvinylidene chloride could be suitably dyed with the new dyestuffs. This, in itself, was quite surprising because a disperse dyestuff would be expected to give good results when applied to nylon or cellulose acetate fibers. On the other hand, neither the polyolefins nor polyvinylidene chloride have as yet been dyed with any success with the known disperse dyestuffs from an aqueous dispersion.

Accordingly, no attempt is made herein to explain the exact mechanism by which the new dyestuffs of the invention are associated or bound by the fibers of polyolefins and polyvinylidene chloride. The long chain alkyl substituent has now been definitely established as having a peculiar affinity for just these particular fibers, i.e. the dyestuffs containing this substituent are selective to these fibers, whereas disperse dyes generally are widely applicable to very dissimilar fibers. On the other hand, the affinity of these dyestuffs for a polyolefin cannot possibly be that of a direct chemical linkage to the fiber as occurs with a carboxlic group on cotton. It can only be stated that the method of dyeing should be classified with the disperse dyes while the attraction of the dyestuff to the fiber should be classified with the direct dyes which are highly selective according to the particular fiber being treated and the substantive group contained in the dyestuff.

In the method of dyeing according to the invention, there is no problem with respect to selecting suitable dispersing agents. The preferred dispersing agents are those classified as the non-ionic water-soluble type, for example, the polyoxyethyl ethers, the polyoxyethyl alkyl phenols, or a reaction product of castor oil with ethylene oxide. These compounds generally produce oil-in-water dispersions and are particularly adapted to the alkyl-substituted dyestuffs of the invention. More extensive information concerning these non-ionic, water-soluble surface active agents can be found in "Surface Active Agents" by Schwartz and Perry, Interscience Publishers, New York (1949), pages 202–213. A small amount of soap or a similar additive can also be contained in the aqueous dye baths of the invention, but the dye bath should ordinarily have about a neutral pH or may be slightly alkaline, particularly where coupling of an azo dyestuff is carried out in situ.

The terms "applying" or "applied" are employed hereinabove and in the following claims to include both the application of the complete dyestuff to the fiber and also the application of one component of the dyestuff to the fiber followed by development of the dyestuff directly upon the fiber.

Although particular azo dyestuffs have been given as examples herein, they have been selected for the primary purpose of disclosing the substantive nature of the long chain alkyl group according to the basic concept of the invention. Therefore, it will be clearly understood that those skilled in the art can readily apply the foregoing teaching to many suitable water-insoluble dyestuffs of the benzene series without deviating from the spirit or scope of the invention as set forth in the appended claims.

The novel dyestuffs of the invention, characterized by an alkyl substituent of at least 7 carbon atoms, provide for the first time a satisfactory method of dyeing polyolefins and polyvinylidene chloride in an aqueous dye bath and in the absence of any organic solvent. There is a relatively deep penetration of the dye into the filament, and the dyed filaments have a good fastness to both washing and solvents. The invention not only permits polyolefins and polyvinylidene chloride to be dyed in a most economical and convenient fashion, but it also sets forth an entire new class of dyestuffs which are specific or selective toward these particular polymers. This latter feature of selectivity is especially advantageous for obtaining cross-dyeing effects in fiber mixtures.

With the present increasing utility of the polyolefins as artificial fibers, especially the high-molecular weight, highly linear polyethylenes and polypropylenes, the present invention satisfies a very urgent need for a simple method of dyeing these fibers and offers a much wider choice of colors, shades, tones and the like. The use of polyvinylidene chloride fibers and fabrics will also be greatly enhanced by the use of the new dyestuffs.

The invention is hereby claimed as follows:

1. A colored fibrous material selected from the group consisting of polyolefins and polyvinylidene chloride containing a water-insoluble dyestuff selected from the group consisting of compounds having the general formulae (1)
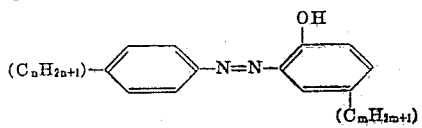

and (2)
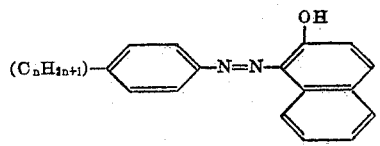

wherein $n$ and $m$ represent an integer of from 7 to 20, inclusive.

2. A colored fibrous material as claimed in claim 1 wherein said fibrous material is polyethylene.

3. A colored fibrous material as claimed in claim 1 wherein said fibrous material is polyvinylidene chloride.

4. A colored fibrous material as claimed in claim 1 wherein said fibrous material is polypropylene.

5. A method of dyeing a fibrous material selected from the group consisting of polyethylene and polyvinylidene chloride which comprises applying to said material from an aqueous dispersion a water-insoluble azo dyestuff selected from the group consisting of compounds having the general formulae (1)
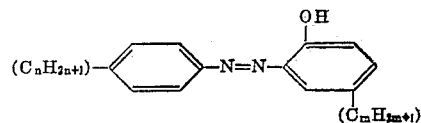

and (2)
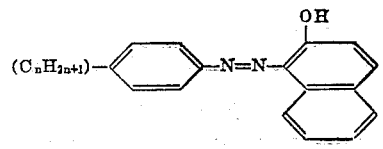

wherein $n$ and $m$ represent an integer of from 7 to 20, inclusive.

6. A method of dyeing as claimed in claim 5 wherein one of the alkyl-substituted components of the dyestuff is first applied to the fibrous material from an aqueous dispersion and the dyestuff is then produced on the fibrous material by coupling of the other component.

References Cited in the file of this patent

UNITED STATES PATENTS

| | | |
|---|---|---|
| 2,205,191 | Flaks | June 18, 1940 |
| 2,302,530 | Crossley | Nov. 17, 1942 |
| 2,593,406 | Berry | Apr. 22, 1952 |
| 2,850,493 | Seruto | Sept. 2, 1958 |
| 2,888,452 | Schmid | May 26, 1959 |